(12) United States Patent
Driussi et al.

(10) Patent No.: US 10,501,882 B2
(45) Date of Patent: Dec. 10, 2019

(54) SYSTEM FOR MONITORING ELECTRIC LOADS AND FOR MONITORING DRIVING APPARATUSES OF SAID ELECTRIC LOADS

(71) Applicant: Electrolux Appliances Aktiebolag, Stockholm (SE)

(72) Inventors: Paolo Driussi, Zoppola (IT); Alessandro Cecco, Sedegliano (IT)

(73) Assignee: Electrolux Appliances Aktiebolag (SE)

( * ) Notice: Subject to any disclaimer, the term of this patent is extended or adjusted under 35 U.S.C. 154(b) by 686 days.

(21) Appl. No.: 15/104,607

(22) PCT Filed: Nov. 26, 2014

(86) PCT No.: PCT/EP2014/075684
§ 371 (c)(1),
(2) Date: Jun. 15, 2016

(87) PCT Pub. No.: WO2015/090872
PCT Pub. Date: Jun. 25, 2015

(65) Prior Publication Data
US 2016/0312395 A1    Oct. 27, 2016

(30) Foreign Application Priority Data
Dec. 19, 2013    (EP) ..................................... 13198341

(51) Int. Cl.
*H04B 10/08* (2006.01)
*D06F 37/30* (2006.01)
(Continued)

(52) U.S. Cl.
CPC .......... *D06F 37/304* (2013.01); *H02M 5/293* (2013.01); *H02M 7/217* (2013.01)

(58) Field of Classification Search
CPC ...... D06F 37/304; H02M 5/293; H02M 7/217
See application file for complete search history.

(56) References Cited

U.S. PATENT DOCUMENTS 4,972,134 A * 11/1990 Getz ....................... H02P 25/04
318/754
5,333,474 A * 8/1994 Imai ..................... D06F 37/304
318/754
(Continued)

FOREIGN PATENT DOCUMENTS

GB            1498397 A        1/1978

OTHER PUBLICATIONS

TDA1085C; Universal Motor Speed Controller by ON semiconductor (www.onsemi.com) (Year: 2007).*
(Continued)

*Primary Examiner* — Muhammad S Islam
(74) *Attorney, Agent, or Firm* — RatnerPrestia (57) ABSTRACT

A washing and/or drying appliance (100) includes an electric load (115; 144; 170; 177) and a driving apparatus (200) for driving the electric load (115; 144; 170; 177). The driving apparatus (200) includes: —a TRIAC (205) comprising a first anode terminal (M1) coupled with a first terminal (TN) of an AC electric power supply and a second anode terminal (M2) coupled with a first terminal of the electric load (115; 144; 70; 177). The electric load (115; 144; 170; 177) includes a second terminal coupled with a second terminal (TL) of the AC electric power supply; —a microcontroller (215) configured to generate a driving signal, and —a triggering circuit (208) for activating the TRIAC (205) by providing triggering pulse signals to a gate terminal (G) of the TRIAC (205) based on the driving signal. A monitoring circuit (230; 215; 235) includes: —the microcontroller (215), and —a feedback circuit branch (230) connected between the gate terminal (G) of the TRIAC (205) and an input terminal of the microcontroller (215) for providing the voltage at the gate terminal (G) of the TRIAC (205) to the microcontroller (215). The monitoring circuit (230; 215; 235) is configured to monitor the driving signal and the voltage at the gate terminal (G) of the TRIAC (205) and to assess an operating condition of the electric load (115; 144;
(Continued)

170; 177), the TRIAC (205) and the triggering circuit (208) based on a monitored value of said driving signal and on a monitored value of the voltage at the gate terminal (G) of the TRIAC (205).

19 Claims, 2 Drawing Sheets

(51) Int. Cl.
*H02M 5/293* (2006.01)
*H02M 7/217* (2006.01)

(56) References Cited

U.S. PATENT DOCUMENTS

| | | | | |
|---|---|---|---|---|
| 5,629,571 A | * | 5/1997 | Roudeski | G01R 31/263 307/130 |
| 5,682,634 A | * | 11/1997 | Cheong | D06F 37/304 68/12.04 |
| 5,734,289 A | | 3/1998 | Khudoshin | |
| 5,883,488 A | * | 3/1999 | Woodward | H02P 1/44 318/772 |
| 6,495,996 B1 | * | 12/2002 | Redlich | G05F 5/00 323/300 |
| 2007/0093928 A1 | | 4/2007 | Forster et al. | |
| 2012/0087052 A1 | | 4/2012 | Dreser et al. | |

OTHER PUBLICATIONS

International Search Report in corresponding International Application No. PCT/EP2014/075684, dated May 15, 2015.

* cited by examiner

SYSTEM FOR MONITORING ELECTRIC LOADS AND FOR MONITORING DRIVING APPARATUSES OF SAID ELECTRIC LOADS

BACKGROUND

The present invention generally relates to the field of driving apparatuses for driving electric loads through TRIACs (Triode for Alternating Current). More specifically, the present invention relates to a system for monitoring such driving apparatuses and such electric loads.

TRIACs are typically employed in those applications in which an electric load should be supplied with an adjustable AC power, such as for example in motor speed regulation and temperature control. Making reference to the washing and/or drying appliances, comprising laundry washing and/or drying machines and dishwashers, such electric loads may for example comprise: the drain pump and/or the recirculation pump of a laundry washing machine, a laundry washing and drying machine or a dishwasher; the electric motor for rotating the rotatable drum of a laundry washing and/or drying machine; the heating resistor(s) for heating the washing liquid of a laundry washing machine, a laundry washing and drying machine or a dishwasher; the heating resistor(s) for heating the process air of a laundry drying or a laundry washing and drying machine; the process fan for circulating the process air of a laundry drying or laundry washing and drying machine; the compressor of an heat pump for demoisturizing and heating the process air of a laundry drying or a laundry washing and drying machine; a fan for cooling the compressor of an heat pump for demoisturizing and heating the process air of a laundry drying or a laundry washing and drying machine; a pump for draining condensation water of a laundry drying or a laundry washing and drying machine.

As it is well known to a person skilled in the art, a typical driving apparatus for driving an electric load through a TRIAC comprises a TRIAC connected in series with the electric load between the line and the neutral terminals of an AC power supply, and a triggering circuit connected to the gate terminal of the TRIAC for switching on the TRIAC at an adjustable time (phase angle) after the start of each half-cycle of the AC voltage waveform at the line terminal, thereby altering the actual voltage difference waveform applied between the electric load terminals and so changing its RMS (Root Mean Square) effective value.

U.S. Pat. No. 5,734,289 discloses a circuit arrangement for controlling an alternating current through a TRIAC. The circuit arrangement comprises a TRIAC having a gate terminal and first and second terminals through which an alternating current is supplied, and a threshold detector coupled to the gate terminal of the TRIAC. The threshold detector outputs a signal when the voltage on the gate terminal of the TRIAC is between two predetermined thresholds of opposite polarities. The circuit arrangement further comprises a pulse generator coupled to the threshold detector. The pulse generator is adapted to supply a TRIAC gate pulse to the gate terminal of the TRIAC in response to said signal from the threshold detector, such that TRIAC gate pulses are supplied during zero crossings of the alternating current through the first and second terminals of the TRIAC.

Household and professional appliances typically comprises a number of electric loads adapted to be driven through driving apparatuses comprising a TRIAC. Therefore, it would be highly desirable to monitor the operating condition of said driving apparatuses and of the electric loads, in such a way to detect the occurrence of possible malfunctioning, and, in case a malfunctioning has been detected, to evaluate whether the appliance has to be turned off based on the gravity of the detected malfunctioning.

It is known to provide monitoring circuits adapted to monitor the operating condition of the driving apparatuses, and/or of the electric loads, in order to signal if a malfunctioning of some kind has occurred.

However, the Applicant has found that none of the solutions known in the art are satisfactory, being too expensive, too complex, power-consuming in the stand-by, and/or requiring calibration.

SUMMARY OF SELECTED INVENTIVE ASPECTS

The aim of the present invention is therefore to provide a monitoring circuit adapted to monitor the operating condition of apparatuses for driving electric loads through TRIACs, and for monitoring the operating condition of such electric loads, that is not affected by the abovementioned drawbacks.

An aspect of the present invention proposes a washing and/or drying appliance. Said washing and/or drying appliance comprises an electric load and a driving apparatus for driving the electric load. The driving apparatus comprises a TRIAC comprising a first anode terminal coupled with a first terminal of an AC electric power supply and a second anode terminal coupled with a first terminal of the electric load. The electric load comprises a second terminal coupled with a second terminal of the AC electric power supply. The driving apparatus further comprises a microcontroller configured to generate a driving signal, and a triggering circuit for activating the TRIAC by providing triggering pulse signals to a gate terminal of the TRIAC based on the driving signal. The washing and/or drying appliance further comprises a monitoring circuit comprising the microcontroller and a feedback circuit branch connected between the gate terminal of the TRIAC and an input terminal of the microcontroller for providing the voltage at the gate terminal of the TRIAC to the microcontroller. The monitoring circuit is configured to monitor the driving signal and the voltage at the gate terminal of the TRIAC and to assess an operating condition of the electric load, the TRIAC and the triggering circuit based on a monitored value of said driving signal and on a monitored value of the voltage at the gate terminal of the TRIAC.

According to an embodiment of the present invention, said operating condition of the electric load, the TRIAC and the triggering circuit assessed by the monitoring circuit, comprises:
- a malfunctioning operating condition, in which at least one among the electric load, the TRIAC and the triggering circuit is malfunctioning and each other among the electric load, the TRIAC and the triggering circuit is not malfunctioning, or
- a non-malfunctioning operating condition, in which the electric load, the TRIAC and the triggering circuit are not malfunctioning.

According to an embodiment of the present invention, the microcontroller is configured to compare the monitored value of said driving signal and the monitored value of said voltage at the gate terminal of the TRIAC with a plurality of pairs of reference values in such a way to assess the operating condition of the electric load, the TRIAC and the triggering circuit based on said comparison. Each pair of reference values corresponds to a respective operating condition of the electric load, the TRIAC and the triggering circuit.

According to an embodiment of the present invention, each pair of reference values comprises a corresponding driving signal reference value, and a corresponding gate voltage reference value. The microcontroller is configured to assess that the electric load, the TRIAC and the triggering circuit are in an operating condition corresponding to a selected pair of reference values if:

the monitored value of said driving signal matches the driving signal reference value of the selected pair of reference values, and the monitored value of said voltage at the gate terminal matches the gate voltage reference value of the selected pair of reference values.

According to an embodiment of the present invention, in each pair of reference values, the driving signal reference value is a first driving signal reference value or is a second driving signal reference value.

According to an embodiment of the present invention, the washing and/or drying appliance further comprises an AC-DC conversion unit for receiving said AC electric power supply and providing a corresponding DC supply voltage and a corresponding ground voltage. Said first driving signal reference value corresponds to the DC supply voltage, and said second driving signal reference value corresponds to the ground voltage.

According to an embodiment of the present invention, in each pair of reference values, the gate voltage reference value is a first gate voltage reference value, is a second gate voltage reference value or oscillates between said first gate voltage reference value and said second gate voltage reference value.

According to an embodiment of the present invention, said first gate voltage reference value corresponds to the voltage of the first terminal of the AC electric power supply, and said second gate voltage reference value corresponds to the voltage of the first terminal of the AC electric power supply minus a voltage drop of a diode of the TRIAC.

According to an embodiment of the present invention, the triggering circuit comprises a transistor having a control terminal coupled with the microcontroller for receiving the driving signal, a first conduction terminal connected to the ground terminal, and a second conduction terminal connected to a first terminal of a resistor. The resistor comprises a second terminal coupled with the gate terminal of the TRIAC.

According to an embodiment of the present invention, said plurality of pairs of reference values comprises a first pair of reference values in which the driving signal reference value is the second driving signal reference value and the gate voltage reference value is the first gate voltage reference value. Said first pair of reference values corresponds to an operating condition of the electric load, the TRIAC and the triggering circuit in which:

the TRIAC is not malfunctioning and is turned off;
the triggering circuit is not malfunctioning, and
the electric load is not malfunctioning and is turned off.

According to an embodiment of the present invention, said plurality of pairs of reference values comprises a second pair of reference values in which the driving signal reference value is the first driving signal reference value and the gate voltage reference value oscillates between the first gate voltage reference value and the second gate voltage reference value. Said second pair of reference values corresponds to an operating condition of the electric load, the TRIAC and the triggering circuit in which:

the TRIAC is not malfunctioning and is turned on;
the triggering circuit is not malfunctioning, and
the electric load is not malfunctioning and is turned on.

According to an embodiment of the present invention, said plurality of pairs of reference values comprises a third pair of reference values in which the driving signal reference value is the first driving signal reference value and the gate voltage reference value is the first gate voltage reference value. Said third pair of reference values corresponds to an operating condition of the electric load, the TRIAC and the triggering circuit in which:

the TRIAC is not malfunctioning and is turned off;
the resistor is broken or disconnected from the TRIAC and/or from the transistor, and/or the transistor is broken and cannot conduce, and
the electric load is not malfunctioning and is turned off.

According to an embodiment of the present invention, said plurality of pairs of reference values comprises a fourth pair of reference values in which the driving signal reference value is the second driving signal reference value and the gate voltage reference value is the second gate voltage reference value. Said fourth pair of reference values corresponds to an operating condition of the electric load, the TRIAC and the triggering circuit in which:

the TRIAC has the first anode terminal short circuited with the second anode terminal;
the triggering circuit is not malfunctioning, and
the electric load is disconnected from the second terminal of the AC power supply and/or from the TRIAC.

According to an embodiment of the present invention, said plurality of pairs of reference values comprises a fifth pair of reference values in which the driving signal reference value is the second driving signal reference value and the gate voltage reference value oscillates between the first gate voltage reference value and the second gate voltage reference value. Said fifth pair of reference values corresponds to an operating condition of the electric load, the TRIAC and the triggering circuit in which:

the TRIAC has the first anode terminal short circuited with the second anode terminal;
the triggering circuit is not malfunctioning, and
the electric load is not malfunctioning and is turned on.

According to an embodiment of the present invention, said plurality of pairs of reference values comprises a sixth pair of reference values in which the driving signal reference value is the first driving signal reference value and the gate voltage reference value is the second gate voltage reference value. Said sixth pair of reference values corresponds to an operating condition of the electric load, the TRIAC and the triggering circuit in which:

the TRIAC is not malfunctioning and is turned on;
the triggering circuit is not malfunctioning, and
the electric load is disconnected from the second terminal of the AC power supply and/or from the TRIAC.

According to an embodiment of the present invention, said first terminal of the AC electric power supply is coupled with the AC-DC conversion unit to receive the DC supply voltage.

According to an embodiment of the present invention, the washing and/or drying appliance is a laundry washing or a laundry washing and drying machine comprising a washing tub housing a rotatable drum in which laundry to be washed or washed and dried can be loaded, and a discharge duct fluidly connected to the washing tub for receiving washing/rinsing liquid to be discharged. The electric load is at least a selected one among an electric motor for rotating the rotatable drum, a heating resistor for heating washing liquid in the washing tub, a drain pump selectively operable to remove washing/rinsing liquid from the discharge duct, and a recirculation pump selectively operable to selectively cause washing/rinsing liquid located into the discharge duct to be conveyed back into the washing tub.

According to an embodiment of the present invention, the washing and/or drying appliance is a laundry drying or a laundry washing and drying machine. The electric load is at least a selected one among a process fan selectively operable for circulating process air, a heating resistor selectively operable for heating said process air, a compressor of an heat pump selectively operable for demoisturizing and heating said process air, a fan selectively operable for cooling said compressor of the heat pump, and a pump selectively operable for draining condensation water.

According to an embodiment of the present invention, said monitoring circuit further comprises a filter unit connected to the input terminal of the microcontroller for filtering possible noises affecting the voltage at the gate terminal of the TRIAC.

BRIEF DESCRIPTION OF THE DRAWINGS

These, and others, features and advantages of the solution according to the present invention will be better understood by reading the following detailed description of some embodiments thereof, provided merely by way of exemplary and non-limitative examples, to be read in conjunction with the attached drawings, wherein.

DETAILED DESCRIPTION OF EXAMPLE EMBODIMENTS

Figure 1:
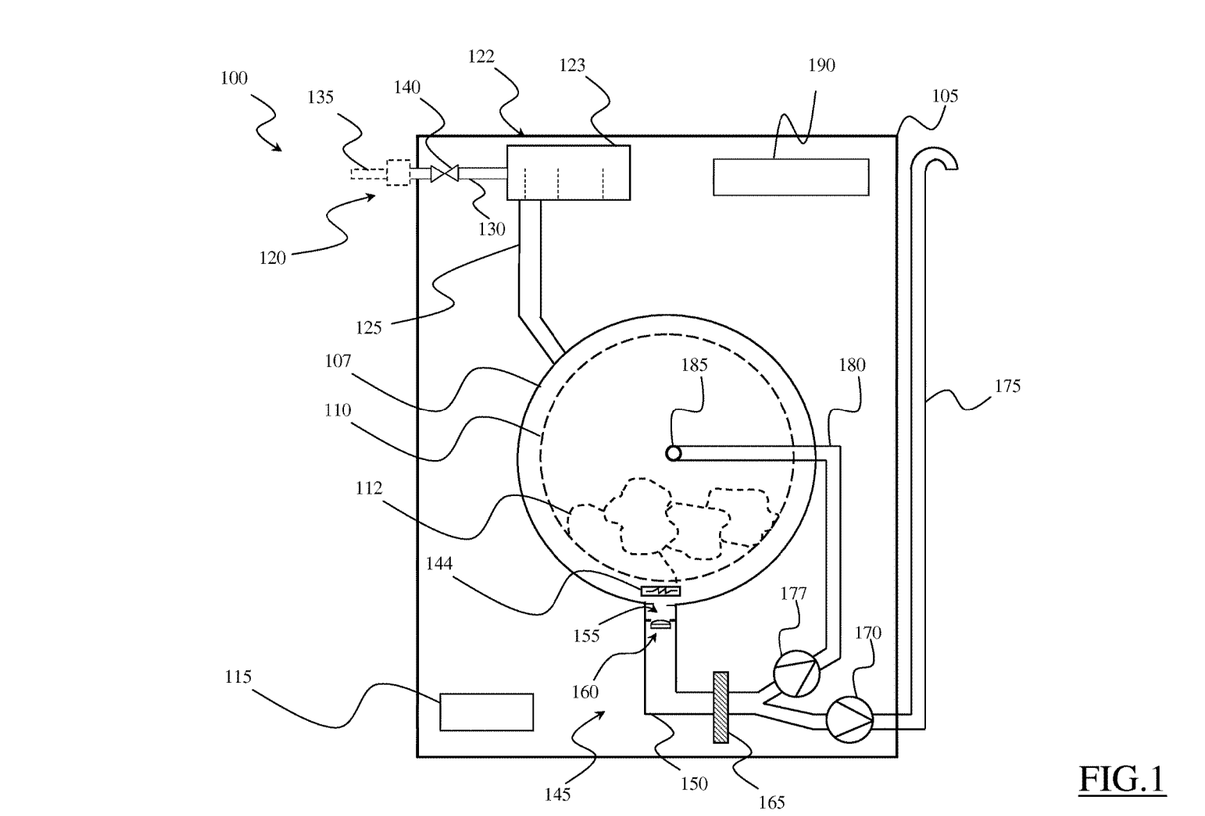
FIG. 1 is a schematic view of an appliance in which embodiments of the present invention may be implemented, and FIG. 2 schematically illustrates a driving apparatus of the appliance of FIG. 1 and a monitor circuit according to an embodiment of the present invention.

With reference to the drawings, FIG. 1 illustrates an appliance 100 in which embodiments of the present invention may be implemented. The appliance 100 may be for example a washing and/or drying appliance. The appliance 100 illustrated in FIG. 1 is a laundry washing machine for treating (washing, or washing/drying) laundry of the front-loading type. Anyway, it should be apparent from the following description that the invention can be applied, without any substantial modification, to a laundry washing machine of the top-loading type.

In the example at issue, the appliance 100 advantageously comprises a casing 105, preferably substantially parallelepiped-shaped, that encloses a washing tub 107 wherein laundry is treated, along with any other components of the washing machine 100 necessary for the operation (e.g., hydraulic, electronic and electromechanical apparatuses). The washing tub 107 has preferably a substantially cylindrical shape and it is made of waterproof material which is also able to withstand operating temperatures and chemicals reactions promoted by washing liquids during the washing machine operation, such as a plastic polymer.

The washing tub 107 houses a rotatable drum 110, preferably perforated, preferably substantially cylindrical-shaped, in which laundry 112 to be washed can be loaded. The rotatable drum 110 is adapted to be selectively rotated, preferably at variable rotation speeds, by an electric motor, only conceptually depicted in figure and denoted, as a whole, by the reference 115.

In order to allow a user to access the washing tub and the inside of the drum 110 (for loading/unloading the laundry), a loading/unloading opening, closable by a door, not illustrated, is advantageously provided, preferably on a front side of the appliance 100.

A water supply system 120 and a detergent supply system 122 are arranged preferably in the upper part of the appliance 100 for supplying washing liquid into the washing tub 107. The detergent supply system 122 advantageously comprises a removable drawer 123 provided with compartments suited to be filled with washing and/or rinsing products.

Water flowing through the water supply system 120 is advantageously supplied into the washing tub 107 by making it flow through the drawer 123 and through an inlet line 125 in fluid communication with the washing tub 107. Advantageously, the water supply system 120 further comprises a main pipe 130 fluidly connecting the drawer 123 to an external water supply line 135, preferably by means of a controlled input supply valve 140.

Washing liquid which reaches the washing tub 107 may selectively contain one of the products (e.g., detergent, softener, bleach) contained in the compartments of the drawer 123, or may be clean water (i.e., which does not contain any product), depending on the washing program which is actually performed. Alternative arrangements may be provided, for example with a separate water inlet line adapted to supply exclusively clean water into the washing tub 107.

A heating element 144, such as an electric resistor, is located on the bottom portion of the washing tub 107, for heating the washing/rinsing liquid inside the washing tub 107 when activated.

The appliance 100 is provided with a discharge system 145 adapted to selectively remove (or drain) washing/rinsing liquid from the washing tub 107.

The discharge system 145 comprises a discharge duct 150 fluidly connected to the washing tub 107 for receiving the washing/rinsing liquid to be discharged. The discharge duct 150 may be made of a rigid material, such as plastic. Anyway, the discharge duct 150 may be a flexible hose, for example made of a flexible material, such as rubber. The discharge duct 150 is arranged to be, preferably selectively, in fluid communication with the washing tub 107 through a discharge hole 155 provided at the bottom of the washing tub 107. Preferably, a valve 160 is provided for selectively opening/closing the discharge hole 155, in order to selectively allow/block liquid to flow between the washing tub and 107 the discharge duct 150. Downstream the valve 160, an anti-fluff/anti-clog filter 165 is preferably provided.

Downstream the anti-fluff/anti-clog filter 165, a drain pump 170 is provided, which is operable to selectively cause liquid located into the discharge duct 150 to be discharged through a drain duct 175 adapted to be connected to a water drain network system (not illustrated).

A recirculation pump 177, for example in parallel with the drain pump 170, may be also provided, which is operable to selectively cause liquid located into the discharge duct 150 to be conveyed back into the washing tub 107 through a recirculation conduit 180, preferably for being sprayed inside the drum 110, e.g., by means of nozzle(s) 185 located on the drum 110 in proximity of the rotation axis thereof.

The electric motor 115, the heating element 144, the drain pump 170, and—if present—the recirculation pump 177, are each one driven by a respective driving apparatus comprising a respective TRIAC arranged to selectively couple said electric motor 115, heating element 144, drain pump 170, or recirculation pump 177 to line and neutral terminals of an AC electric power supply. Said driving apparatuses (not illustrated in FIG. 1) are preferably located on the electronic control unit 190 (e.g., a programmable electronic board) of the apparatus 100.

Figure 2:
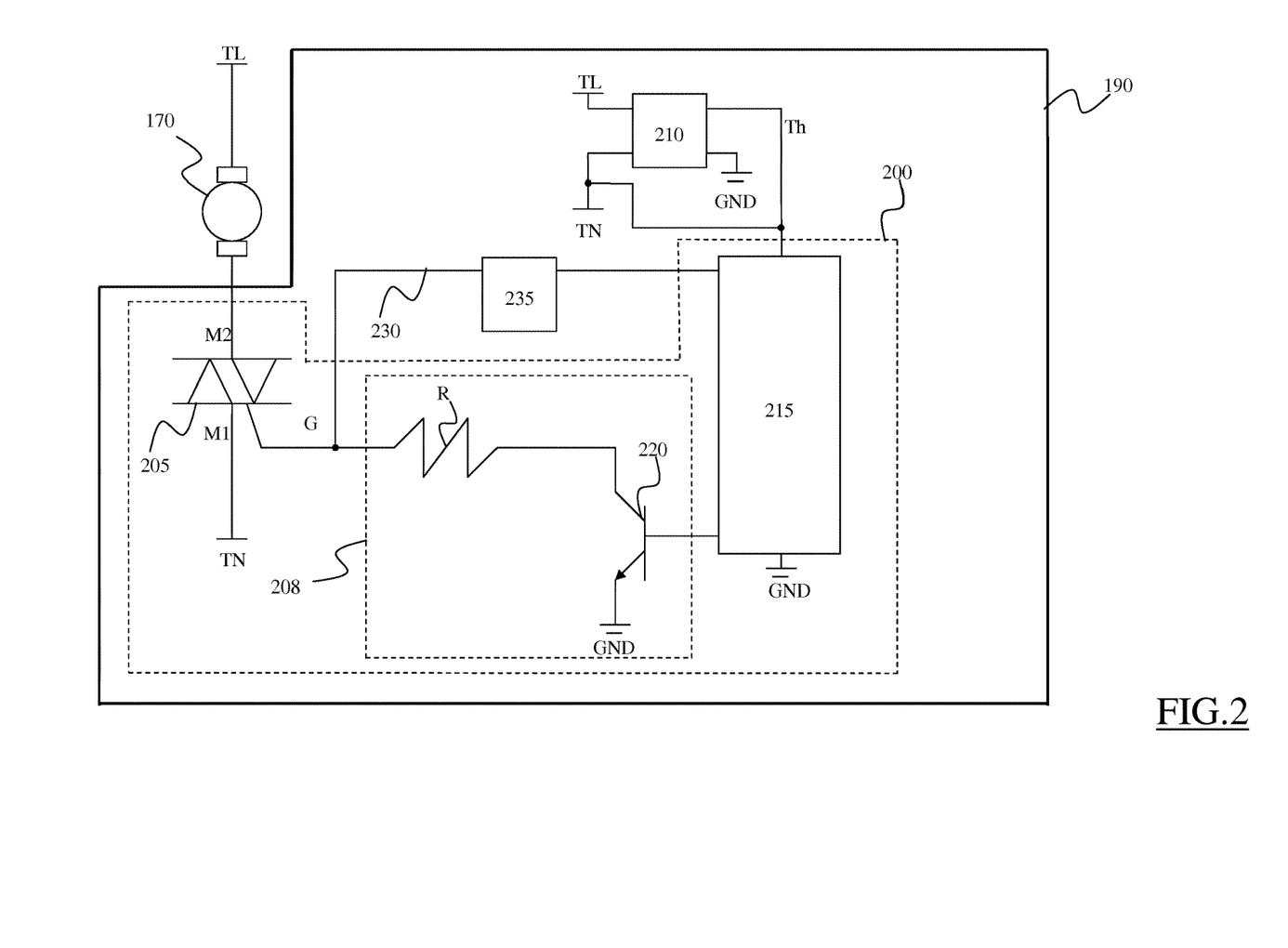

FIG. 2 schematically illustrates in terms of circuit elements the driving apparatus, identified with the reference 200, designed to drive the drain pump 170.

The driving apparatus 200 comprises a TRIAC 205 having a first anode terminal M1 connected to the neutral terminal (identified in FIG. 2 with reference TN) of the AC electric power supply providing a reference signal Vn, a second anode terminal M2 connected to a first terminal of the drain pump 170, and a gate terminal G connected to a triggering circuit 208 adapted to generate triggering pulse signals for activating the TRIAC 205. The drain pump 170 comprises a second terminal connected to the line terminal (identified in FIG. 2 with reference TL) of the AC electric power supply providing an AC supply signal Vl with respect to the reference signal Vn. In the example at issue, the AC supply signal Vl is a 230V or 125V alternating voltage at a 50 Hz or 60 Hz frequency, having a full-wave periodic, e.g., sinusoidal, waveform. Although in the embodiment illustrated in figure the first anode terminal M1 of the TRIAC 205 is directly connected to the neutral terminal TN of the AC electric power supply, and the second terminal of the drain pump 170 is directly connected to the line terminal TL of the AC electric power supply, similar considerations apply if the first anode terminal M1 of the TRIAC 205 and/or the second terminal of the drain pump 170 are/is coupled with said terminals of the AC electric power supply through electric components (not illustrated), such as for example switches or relays.

An AC-DC conversion circuit (only conceptually illustrated in the figure and denoted, as a whole, by the reference 210) is provided, comprising transforming, rectifying and regulation components for receiving the (AC) electric power supply (from line TL and neutral TN terminals) and providing one or more DC voltages, such as a ground voltage GND and a DC supply voltage Vcc (e.g., a 3V, 5V or 12V DC voltage with respect to the ground voltage GND). The DC voltages generated by the AC-DC conversion unit 210 are used for supplying the electric and electronic components included in the electronic control unit 190, such as a microcontroller 215 directed to manage the operation of the apparatus 100. For this purpose, the microcontroller 215 is connected between a DC supply terminal Th for receiving the DC supply voltage Vcc and a ground terminal GND for receiving the ground voltage GND. As visible in FIG. 2, the neutral terminal TN is preferably coupled with the terminal of the AC-DC conversion unit 210 providing the DC supply voltage Vcc, and therefore to the DC supply terminal Th of the microcontroller 215, so that the reference signal Vn is set to the DC supply voltage Vcc for allowing proper driving of power components, such as the TRIAC 205.

The triggering circuit 208 for activating the TRIAC 205 is driven by the microcontroller 215. For example, the triggering circuit 208 comprises a bipolar transistor 220 having a base terminal coupled with the microcontroller 215 for receiving a driving signal Vd capable of selectively taking a high value corresponding to the DC supply voltage Vcc and a low value corresponding to the ground voltage GND, an emitter terminal connected to the ground terminal GND for receiving the ground voltage GND, and a collector terminal connected to a first terminal of a resistor R. The resistor R has a second terminal connected to the gate terminal G of the TRIAC 205.

When the microcontroller 215 sets the driving signal Vd to the low value, the transistor 220 is off, and the gate terminal G of the TRIAC 205 is floating. In this condition, the TRIAC 205, and therefore the drain pump 170, are off.

In order to trigger the activation of the TRIAC 205 for turning on the drain pump 170, the microcontroller 215 sets the driving signal Vd to the high value, turning on the transistor 220. In this condition, a current pulse flows from the gate terminal G toward the ground terminal GND flowing across the resistor R and the transistor 220, triggering the activation of the TRIAC 205, and then turning on the drain pump 170. As it is well known to the person skilled in the art, the delay at which the current pulse is generated with respect to the start of the half-cycles of the AC supply signal Vl at the line terminal TL sets the actual voltage difference waveform applied between the drain pump 170 terminals, thus determining its RMS effective value (which sets in turn the actual flow rate of the drain pump 170).

The Applicant has observed that by jointly monitoring the values taken by the driving signal Vd and by the voltage Vg at the gate terminal G of the TRIAC 205 it is possible to deduce the operating condition of the triggering circuit 208, the TRIAC 205 and the drain pump 170, assessing whether the triggering circuit 208, the TRIAC 205 and the drain pump 170 are malfunctioning or not.

For example, if the driving signal Vd has been set equal to the low value for turning off the TRIAC 205 (and therefore the drain pump 170), and the gate terminal G of the TRIAC 205 is floating at a voltage Vg equal to the (DC) biasing voltage of the TRIAC 205, i.e., Vg=Vn, the triggering circuit 208, the TRIAC 205 and the drain pump 170 are in an operating condition in which they are not malfunctioning, with the transistor 220, the TRIAC 205, and the drain pump 170 that are off. In this situation, the gate terminal G of the TRIAC 205 is floating at a voltage Vg=Vn since the TRIAC 205 is turned off, and is not conducting any current between the anode terminals M1 and M2.

If instead the driving signal Vd has been set equal to the high value for triggering the activation of the TRIAC 205 (and therefore to activate the drain pump 170), and the gate terminal G thereof is at a voltage Vg oscillating (at the same frequency of the AC supply signal Vl at the line terminal TL) between the biasing voltage of the TRIAC 205 and (e.g., Vn) and said biasing voltage minus the voltage drop Vth of each diode included in the TRIAC 205 (e.g., Vn−Vth), the triggering circuit 208, the TRIAC 205 and the drain pump 170 are in an operating condition in which they are not malfunctioning, with the transistor 220 that is turned on, generating a current pulse flowing from the gate terminal G toward the ground terminal GND across the resistor R and the transistor 220 itself, triggering the activation of the TRIAC 205, and then turning on the drain pump 170. In this situation, the gate terminal G is at a voltage Vg oscillating between Vn and Vn−Vth since the TRIAC 205 is activated and conduces current between the anode terminals M1 and M2.

If the driving signal Vd has been set equal to the high value for triggering the activation of the TRIAC 205 (and therefore to activate the drain pump 170), and the gate terminal G of the TRIAC 205 is floating at a voltage Vg equal to the (DC) biasing voltage of the TRIAC 205, i.e., Vg=Vn, the triggering circuit 208, the TRIAC 205 and the drain pump 170 are in an operating condition in which the TRIAC 205 and the drain pump 170 are not malfunctioning, while the triggering circuit 208 is malfunctioning (e.g., the resistor R is broken or disconnected from the TRIAC 205 and/or from the transistor 220 and/or the transistor 220 is broken and cannot conduce), with the TRIAC 205 and the drain pump 170 that are off. In this situation, the gate terminal G of the TRIAC 205 is floating at a voltage Vg=Vn since the TRIAC 205 is turned off, and is not conducting any current between the anode terminals M1 and M2.

If the driving signal Vd has been set equal to the low value for turning off the TRIAC 205 (and therefore the drain pump 170), and the gate terminal G of the TRIAC 205 is at a voltage Vg equal to the biasing voltage thereof minus the voltage drop of each diode included in the TRIAC 205 (e.g., Vn−Vth), the triggering circuit 208, the TRIAC 205 and the drain pump 170 are in an operating condition in which the triggering circuit 208 is not malfunctioning, while the TRIAC 205 is malfunctioning (e.g., with the anode terminal M1 short circuited with the anode terminal M2) and the drain pump 170 is malfunctioning (e.g., being disconnected from the line terminal TL and/or from the TRIAC 205). In this situation, the gate terminal G of the TRIAC 205 is at a voltage Vg equal to Vn−Vth, since the TRIAC 205 is like if it was turned on, without being crossed by current.

If the driving signal Vd has been set equal to the low value for turning off the TRIAC 205 (and therefore the drain pump 170), and the gate terminal G of the TRIAC 205 is at a voltage Vg oscillating between the biasing voltage of the TRIAC 205 (e.g., Vn) and said biasing voltage minus the voltage drop of each diode included in the TRIAC 205 (e.g., Vn−Vth), the triggering circuit 208, the TRIAC 205 and the drain pump 170 are in an operating condition in which the triggering circuit 208 and the drain pump 170 are not malfunctioning, while the TRIAC 205 is malfunctioning (e.g., with the anode terminal M1 short circuited with the anode terminal M2). In this case, the gate terminal G of the TRIAC 205 is at a voltage Vg oscillating between Vn and Vn−Vth, since the TRIAC 205 is like if it was turned on, and is crossed by current.

If the driving signal Vd has been set equal to the high value for triggering the activation of the TRIAC 205 (and therefore to activate the drain pump 170), and the gate terminal G of the TRIAC 205 is at a voltage Vg equal to the biasing voltage thereof minus the voltage drop of each diode included in the TRIAC 205 (e.g., Vn−Vth), the triggering circuit 208, the TRIAC 205 and the drain pump 170 are in an operating condition in which the TRIAC 205 and the triggering circuit 208 are not malfunctioning and the drain pump 170 is malfunctioning (e.g., being disconnected from the line terminal TL and/or from the TRIAC 205). In this situation, the gate terminal G of the TRIAC 205 is at a voltage Vg equal to Vn−Vth, since the TRIAC 205 is turned on, without being crossed by current (because the drain pump 170 is disconnected).

For this purpose, according to an embodiment of the present invention, a monitoring circuit is provided, which is adapted to monitor the voltage Vg at the gate terminal G of the TRIAC 205 and the driving signal Vd set by the microcontroller 215 and to assess the operating condition of the triggering circuit 208, the TRIAC 205 and the drain pump 170 based on the monitored values of the voltage Vg and of the driving signal Vd.

According to an embodiment of the present invention, said monitor circuit comprises the microcontroller 215 and a feedback circuit branch 230 connected between the gate terminal G of the TRIAC 205 and an (analog) input terminal of the microcontroller 215 for providing the voltage Vg to the TRIAC 205. Preferably, although not necessarily, a filter unit 235 may be provided at the input terminal of the microcontroller 215 connected to the feedback circuit branch 230 to filter possible noises affecting the voltage Vg. For example, the filter unit 235 may be a low-pass filter comprising suitably connected resistors and capacitors (not illustrated in figure but well known to those skilled in the art).

According to an embodiment of the present invention, the microcontroller 215 is configured to compare the monitored values of the voltage Vg at the gate terminal G of the TRIAC 205 and of the driving signal Vd with a plurality of pairs Vpj (j=1, 2, . . . , M) of reference values, each one corresponding to a respective predetermined operating condition OCj of the triggering circuit 208, the TRIAC 205 and the drain pump 170.

According to an embodiment of the present invention, the microcontroller 215 is configured to assess that the operating condition of the triggering circuit 208, the TRIAC 205 and the drain pump 170 is an operating condition corresponding to a selected one among the predetermined operating conditions OCj based on said comparison between the monitored values of Vd, Vg, and the plurality of pairs Vpj of reference values. For this purpose, according to an embodiment of the present invention, each pair Vpj of reference values comprises a driving signal reference value Vdj and a gate voltage reference value Vgj. The microcontroller 215 is configured to assess that the operating condition of the triggering circuit 208, the TRIAC 205 and the drain pump 170 is an operating condition corresponding to a selected predetermined operating conditions OCj if the monitored value of the driving signal Vd matches the driving signal reference value Vdj of the pair Vpj of reference values corresponding to said predetermined operating conditions OCj, and if the monitored value of the voltage Vg at the gate terminal G of the TRIAC 205 matches the gate voltage reference value Vgj of the pair Vpj of reference values corresponding to said predetermined operating conditions OCj. For example, the microcontroller 215 is configured to assess that a monitored value of the driving signal Vd or of the voltage Vg matches a driving signal reference value Vdj or a gate voltage reference value Vgj if said monitored value belongs to a corresponding range of values comprising said reference value (e.g., a range centered on said reference value or having said reference value as an endpoint thereof).

According to an embodiment of the present invention, said pairs Vpj of reference values are the following M=6 pairs of values:
  Vp1: Vd1 equal to the low value (GND);
    Vg1 equal to Vn.
  Vp2: Vd2 equal to the high value (Vcc);
    Vg2 oscillating between Vn and Vn−Vth.
  Vp3: Vd3 equal to the high value (Vcc);
    Vg3 equal to Vn.
  Vp4: Vd4 equal to the low value (GND);
    Vg4 equal to Vn−Vth.
  Vp5: Vd5 equal to the low value (GND);
    Vg5 oscillating between Vn and Vn−Vth.
  Vp6: Vd6 equal to the high value (Vcc);
    Vg6 equal to Vn−Vth.

According to an embodiment of the present invention:
  if the monitored value of the driving signal Vd and the monitored value of the voltage Vg at the gate terminal G of the TRIAC 205 match the pair Vp1 of reference values, the microcontroller 215 is configured to assess that the operating condition of the triggering circuit 208, the TRIAC 205 and the drain pump 170 corresponds to a predetermined operating condition OC1 in which the TRIAC 205 is not malfunctioning and turned off, the triggering circuit 208 is not malfunctioning, and the drain pump 170 is not malfunctioning and turned off;

if the monitored value of the driving signal Vd and the monitored value of the voltage Vg at the gate terminal G of the TRIAC 205 match the pair Vp2 of reference values, the microcontroller 215 is configured to assess that the operating condition of the triggering circuit 208, the TRIAC 205 and the drain pump 170 corresponds to a predetermined operating condition OC2 in which the TRIAC 205 is not malfunctioning and turned on, the triggering circuit 208 is not malfunctioning, and the drain pump 170 is not malfunctioning and turned on;

if the monitored value of the driving signal Vd and the monitored value of the voltage Vg at the gate terminal G of the TRIAC 205 match the pair Vp3 of reference values, the microcontroller 215 is configured to assess that the operating condition of the triggering circuit 208, the TRIAC 205 and the drain pump 170 corresponds to a predetermined operating condition OC3 in which the TRIAC 205 is not malfunctioning and turned off, the triggering circuit 208 is malfunctioning, and the drain pump 170 is not malfunctioning and turned off;

if the monitored value of the driving signal Vd and the monitored value of the voltage Vg at the gate terminal G of the TRIAC 205 match the pair Vp4 of reference values, the microcontroller 215 is configured to assess that the operating condition of the triggering circuit 208, the TRIAC 205 and the drain pump 170 corresponds to a predetermined operating condition OC4 in which the TRIAC 205 is malfunctioning and turned on, the triggering circuit 208 is not malfunctioning, and the drain pump 170 is malfunctioning and turned off;

if the monitored value of the driving signal Vd and the monitored value of the voltage Vg at the gate terminal G of the TRIAC 205 match the pair Vp5 of reference values, the microcontroller 215 is configured to assess that the operating condition of the triggering circuit 208, the TRIAC 205 and the drain pump 170 corresponds to a predetermined operating condition OC5 in which the TRIAC 205 malfunctioning and turned on, the triggering circuit 208 is not malfunctioning, and the drain pump 170 is not malfunctioning and turned on;

if the monitored value of the driving signal Vd and the monitored value of the voltage Vg at the gate terminal G of the TRIAC 205 match the pair Vp6 of reference values, the microcontroller 215 is configured to assess that the operating condition of the triggering circuit 208, the TRIAC 205 and the drain pump 170 corresponds to a predetermined operating condition OC6 in which the TRIAC 205 is not malfunctioning and turned on, the triggering circuit 208 is not malfunctioning, and the drain pump 170 is malfunctioning and turned off.

While the predetermined operating conditions OC1 and OC2 correspond to non-malfunctioning operating conditions, in which the triggering circuit 208, the TRIAC 205 and the drain pump 170 are not malfunctioning, the remaining predetermined operating conditions OC3-OC6 correspond to malfunctioning operating conditions, in which at least one among the triggering circuit 208, the TRIAC 205 and the drain pump 170 is malfunctioning.

According to an embodiment of the present invention, the microcontroller 215 is configured to undertake further actions based on the assessed operating condition. For example, if the assessed operating condition contemplates a malfunctioning, a corresponding malfunctioning log specifying the type of malfunctioning may be memorized in a memory unit, for example provided in the electronic control unit 190 but not illustrated in the figures. Moreover, in case the assessed operating condition contemplates a malfunctioning, the microcontroller 215 may further provide a malfunctioning warning to the user, for example by driving proper visual and/or audio signaling apparatuses (not illustrated in the figure). If the assessed operating condition contemplates a severe malfunctioning, the microcontroller 215 may be further configured to stop the operation of the apparatus 100, such as for example by switching a main power switch (not illustrated in the figure) to disconnect the apparatus from the AC power supply.

The proposed solution is effective, simple and cheap, requiring very few additional components. Moreover, since the operating condition is assessed by sensing the voltage Vg at the gate terminal G, the monitoring circuit according to the present invention consumes additional electric power only when the apparatus 100 is operating (i.e., when the TRIAC 205 and the drain pump 170 are turned on), and not during its stand-by state. Furthermore, the proposed solution does not require any expensive and time-consuming calibration.

It has to be appreciated that the number and type of predetermined operating conditions OCi that can be assessed with the proposed solution may be different from the ones described above. For example, only a subset of the previously described predetermined operating conditions OCi may be exploited.

Moreover, although in the present description reference has been explicitly made to a monitoring circuit which is adapted to assess the operating condition of the triggering circuit 208, the TRIAC 205 and the drain pump 170, similar considerations apply to the driving apparatuses of other electric loads of the appliance 100, such as for example of the electric motor 115, of the heating element 144 or of the recirculation pump 177.

Furthermore, the concepts of the present invention may be applied as well in all the applications in which an electric load is supplied with an adjustable AC power by means of a TRIAC, both in washing and/or drying appliances, and in other type of appliances.

For example, the concepts of the present invention may be applied to electric loads of a laundry drying or a laundry washing and drying machine, both of the so-called "venting" type and of the so-called "condensation" type, comprising a drying chamber configured for housing laundry and for causing process air circulating therethrough to remove moisture from the laundry.

A laundry drying or a laundry washing and drying machine of the venting type is generally configured for continuously drawing cool, dry, ambient air, heating it up (thereby obtaining the corresponding process air), and feeding the process air into the drying chamber (where laundry moisture absorption by the process air occurs). The resulting moisture-laden process air from the drying chamber is then vented outside the laundry dryer to make room for more process air to continue the drying process. In this case, the concepts of the present invention may be applied to the process fan for circulating the process air, and/or to the heating resistor for heating said process air.

A laundry drying or a laundry washing and drying machine of the condensation type generally comprises a heat pump for demoisturizing and heating the process air and a draining unit for draining the condensed (hence, liquid) moisture into a proper collection tank (e.g., for manual extraction and emptying thereof by a user). In this case, the concepts of the present invention may be applied to the process fan for circulating the process air, to the compressor of the heat pump, to the fan for cooling said compressor of the heat pump, and/or to the pump for draining the condensed moisture.

Naturally, in order to satisfy local and specific requirements, a person skilled in the art may apply to the solution described above many logical and/or physical modifications and alterations.

The invention claimed is:

1. A washing and/or drying appliance comprising:
an electric load;
a driving apparatus for driving the electric load, the driving apparatus comprising:
a TRIAC comprising a first anode terminal coupled with a first terminal of an AC electric power supply and a second anode terminal coupled with a first terminal of the electric load, the electric load comprising a second terminal coupled with a second terminal of the AC electric power supply;
a microcontroller configured to generate a driving signal, and
a triggering circuit for activating the TRIAC by providing triggering pulse signals to a gate terminal of the TRIAC based on the driving signal received from the microcontroller;
a monitoring circuit comprising:
the microcontroller, and
a feedback circuit branch connected between the gate terminal of the TRIAC and an input terminal of the microcontroller for providing the voltage at the gate terminal to the TRIAC, wherein:
the monitoring circuit is configured to monitor a high/low value of the driving signal from the microcontroller at an input of the triggering circuit, and a high/low value of the voltage from the triggering circuit at the gate terminal of the TRIAC, and to assess an operating condition of the electric load, the TRIAC and the triggering circuit based on the monitored value of said driving signal of the microcontroller and on the monitored value of the voltage at the gate terminal of the TRIAC.

2. The washing and/or drying appliance of claim 1, wherein said operating condition of the electric load, the TRIAC and the triggering circuit assessed by the monitoring circuit, comprises:
a malfunctioning operating condition, in which at least one among the electric load, the TRIAC and the triggering circuit is malfunctioning and each other among the electric load, the TRIAC and the triggering circuit is not malfunctioning, or
a non-malfunctioning operating condition, in which the electric load, the TRIAC and the triggering circuit are not malfunctioning.

3. The washing and/or drying appliance of claim 1, wherein the microcontroller is configured to compare the monitored value of said driving signal at the input terminal of the microcontroller and the monitored value of said voltage at the gate terminal of the TRIAC with a plurality of pairs of reference values in such a way to assess the operating condition of the electric load, the TRIAC and the triggering circuit based on said comparison, wherein each pair of reference values corresponds to a respective predetermined operating condition of the electric load, the TRIAC and the triggering circuit.

4. The washing and/or drying appliance of claim 3, wherein:
each pair of reference values comprises:
a) a corresponding driving signal reference value, and
b) a corresponding gate voltage reference value, and
the microcontroller is configured to assess that the electric load, the TRIAC and the triggering circuit are in an operating condition corresponding to a selected one of the predetermined operating conditions of the reference values based on the comparison wherein:
the monitored value of said driving signal matches the driving signal reference value of the selected pair of reference values, and
the monitored value of said voltage at the gate terminal matches the gate voltage reference value of the selected pair of reference values.

5. The washing and/or drying appliance of claim 4, wherein in each pair of reference values, the driving signal reference value is a first driving signal reference value or is a second driving signal reference value.

6. The washing and/or drying appliance of claim 5, further comprising an AC-DC conversion unit for receiving said AC electric power supply and providing a corresponding DC supply voltage and a corresponding ground voltage, wherein:
said first driving signal reference value corresponds to the DC supply voltage, and
said second driving signal reference value corresponds to the ground voltage.

7. The washing and/or drying appliance of claim 5, wherein in each pair of reference values, the gate voltage reference value is a first gate voltage reference value, is a second gate voltage reference value or oscillates between said first gate voltage reference value and said second gate voltage reference value.

8. The washing and/or drying appliance of claim 7, wherein:
said first gate voltage reference value corresponds to the voltage of the first terminal of the AC electric power supply;
said second gate voltage reference value corresponds to the voltage of the first terminal of the AC electric power supply minus a voltage drop of a diode of the TRIAC.

9. The washing and/or drying appliance of claim 8, wherein the triggering circuit comprises a transistor having a control terminal coupled with the microcontroller for receiving the driving signal, a first conduction terminal connected to the ground terminal, and a second conduction terminal connected to a first terminal of a resistor, the resistor comprising a second terminal coupled with the gate terminal of the TRIAC.

10. The washing and/or drying appliance of claim 9, wherein said plurality of pairs of reference values comprises a first pair of reference values in which the driving signal reference value is the second driving signal reference value and the gate voltage reference value is the first gate voltage reference value, said first pair of reference values corresponding to operating predetermined operating condition of the electric load, the TRIAC and the triggering circuit in which:
the TRIAC is not malfunctioning and is turned off;
the triggering circuit is not malfunctioning, and
the electric load is not malfunctioning and is turned off.

11. The washing and/or drying appliance of claim 10, wherein said plurality of pairs of reference values comprises a second pair of reference values in which the driving signal reference value is the first driving signal reference value and the gate voltage reference value oscillates between the first gate voltage reference value and the second gate voltage reference value, said second pair of reference values corresponding to operating predetermined operating condition of the electric load, the TRIAC and the triggering circuit in which:

the TRIAC is not malfunctioning and is turned on;
the triggering circuit is not malfunctioning, and
the electric load is not malfunctioning and is turned on.

12. The washing and/or drying appliance of claim 11, wherein said plurality of pairs of reference values comprises a third pair of reference values in which the driving signal reference value is the first driving signal reference value and the gate voltage reference value is the first gate voltage reference value, said third pair of reference values corresponding to operating predetermined operating condition of the electric load, the TRIAC and the triggering circuit in which:

the TRIAC is not malfunctioning and is turned off;
the resistor is broken or disconnected from the TRIAC and/or from the transistor, and/or the transistor is broken and non-operative, and
the electric load is not malfunctioning and is turned off.

13. The washing and/or drying appliance of claim 12, wherein said plurality of pairs of reference values comprises a fourth pair of reference values in which the driving signal reference value is the second driving signal reference value and the gate voltage reference value is the second gate voltage reference value, said fourth pair of reference values corresponding to operating predetermined operating condition of the electric load, the TRIAC and the triggering circuit in which:

the TRIAC has the first anode terminal short circuited with the second anode terminal;
the triggering circuit is not malfunctioning, and
the electric load is disconnected from the second terminal of the AC power supply and/or from the TRIAC.

14. The washing and/or drying appliance of claim 13, wherein said plurality of pairs of reference values comprises a fifth pair of reference values in which the driving signal reference value is the second driving signal reference value and the gate voltage reference value oscillates between the first gate voltage reference value and the second gate voltage reference value, said fifth pair of reference values corresponding to operating predetermined operating condition of the electric load, the TRIAC and the triggering circuit in which:

the TRIAC has the first anode terminal short circuited with the second anode terminal;
the triggering circuit is not malfunctioning, and
the electric load is not malfunctioning and is turned on.

15. The washing and/or drying appliance of claim 14, wherein said plurality of pairs of reference values comprises a sixth pair of reference values in which the driving signal reference value is the first driving signal reference value and the gate voltage reference value is the second gate voltage reference value, said sixth pair of reference values corresponding to operating predetermined operating condition of the electric load the TRIAC and the triggering circuit in which:

the TRIAC is not malfunctioning and is turned on;
the triggering circuit is not malfunctioning, and
the electric load is disconnected from the second terminal of the AC power supply and/or from the TRIAC.

16. The washing and/or drying appliance of claim 6, wherein said first terminal of the AC electric power supply is coupled with the AC-DC conversion unit to receive the DC supply voltage.

17. A washing and/or drying appliance comprising:
an electric load;
a driving apparatus for driving the electric load, the driving apparatus comprising:
a TRIAC comprising a first anode terminal coupled with a first terminal of an AC electric power supply and a second anode terminal coupled with a first terminal of the electric load, the electric load comprising a second terminal coupled with a second terminal of the AC electric power supply;
a microcontroller configured to generate a driving signal, and
a triggering circuit for activating the TRIAC by providing triggering pulse signals to a gate terminal of the TRIAC based on the driving signal received from the microcontroller;
a monitoring circuit comprising:
the microcontroller, and
a feedback circuit branch connected between the gate terminal of the TRIAC and an input terminal of the microcontroller for providing the voltage at the gate terminal to the TRIAC, wherein:
the monitoring circuit is configured to monitor a high/low value of the driving signal at the input terminal of the microcontroller, and a high/low value of the voltage at the gate terminal of the TRIAC, and to assess an operating condition of the electric load, the TRIAC and the triggering circuit based on the monitored value of said driving signal and on the monitored value of the voltage at the gate terminal of the TRIAC, wherein:
the washing and/or drying appliance is a laundry washing or a laundry washing and drying machine comprising a washing tub housing a rotatable drum in which laundry to be washed or washed and dried is loaded, and a discharge duct fluidly connected to the washing tub for receiving washing/rinsing liquid to be discharged, and
the electric load is at least a selected one among:
an electric motor for rotating the rotatable drum;
a heating resistor for heating washing liquid in the washing tub;
a drain pump selectively operable to remove washing/rinsing liquid from the discharge duct, and
a recirculation pump selectively operable to selectively cause washing/rinsing liquid located into the discharge duct to be conveyed back into the washing tub.

18. A washing and/or drying appliance comprising:
an electric load;
a driving apparatus for driving the electric load, the driving apparatus comprising:
a TRIAC comprising a first anode terminal coupled with a first terminal of an AC electric power supply and a second anode terminal coupled with a first terminal of the electric load, the electric load comprising a second terminal coupled with a second terminal of the AC electric power supply;
a microcontroller configured to generate a driving signal, and
a triggering circuit for activating the TRIAC by providing triggering pulse signals to a gate terminal of the TRIAC based on the driving signal received from the microcontroller;

a monitoring circuit comprising:

the microcontroller, and a feedback circuit branch connected between the gate terminal of the TRIAC and an input terminal of the microcontroller for providing the voltage at the gate terminal to the TRIAC, wherein:

the monitoring circuit is configured to monitor a high/low value of the driving signal at the input terminal of the microcontroller, and a high/low value of the voltage at the gate terminal of the TRIAC, and to assess an operating condition of the electric load, the TRIAC and the triggering circuit based on the monitored value of said driving signal and on the monitored value of the voltage at the gate terminal of the TRIAC, wherein:

the washing and/or drying appliance is a laundry drying or a laundry washing and drying machine, and the electric load is at least a selected one among:

a process fan selectively operable for circulating process air;

a heating resistor selectively operable for heating said process air;

a compressor of an heat pump selectively operable for demoisturizing and heating said process air;

a fan selectively operable for cooling said compressor of the heat pump, a pump selectively operable for draining condensation water.

19. The washing and/or drying appliance of claim 1, wherein said monitoring circuit further comprises a filter unit connected to the input terminal of the microcontroller for filtering possible noises affecting the voltage at the gate terminal of the TRIAC.

* * * * *